US010701869B2

United States Patent
Ryan

(10) Patent No.: US 10,701,869 B2
(45) Date of Patent: Jul. 7, 2020

(54) HANGING PLANTER WITH OBSCURED ATTACHMENT POINT

(71) Applicant: Classic Home & Garden, LLC, Monroe, NY (US)

(72) Inventor: Fred Joseph Ryan, Newtown, CT (US)

(73) Assignee: CLASSIC HOME & GARDEN, LLC, Monroe, NY (US)

( * ) Notice: Subject to any disclaimer, the term of this patent is extended or adjusted under 35 U.S.C. 154(b) by 133 days.

(21) Appl. No.: 15/485,393

(22) Filed: Apr. 12, 2017

(65) Prior Publication Data

US 2017/0303477 A1 Oct. 26, 2017

Related U.S. Application Data

(60) Provisional application No. 62/325,232, filed on Apr. 20, 2016.

(51) Int. Cl.
*A01G 9/02* (2018.01)
*A01G 27/00* (2006.01)

(52) U.S. Cl.
CPC ........... *A01G 9/024* (2013.01); *A01G 27/005* (2013.01)

(58) Field of Classification Search
CPC ........ A01G 9/024; A01G 27/005; A01G 9/02; A01G 9/021; A01G 9/023; A01G 9/027; A01G 9/12; A47G 7/04
USPC .......... 47/67; 248/228.7, 230.7, 231.81, 305, 248/316.7, 317, 318, 322, 339; 24/265 H, 24/369, 598.3, 598.4; 220/751
See application file for complete search history.

(56) References Cited

U.S. PATENT DOCUMENTS

| | | | | |
|---|---|---|---|---|
| 1,221,059 A * | 4/1917 | Jones | ............... | F21V 17/00 362/454 |
| 1,334,199 A * | 3/1920 | Weiseman | ............ | A47G 7/044 215/399 |
| 1,419,307 A * | 6/1922 | Richardson | ............ | F21V 17/00 248/318 |
| 1,575,232 A * | 3/1926 | Shearer | ................. | A47G 7/047 294/33 |
| 1,599,525 A * | 9/1926 | Hanson | ................. | A47G 7/047 294/33 |
| 2,006,083 A * | 6/1935 | Dixon | ................... | A01G 23/14 248/312.1 |
| 2,533,845 A * | 12/1950 | Stender | ................. | A47G 7/047 248/318 |
| 2,967,691 A * | 1/1961 | Lehnbeuter | ........... | A47G 7/044 248/312.1 |
| 3,184,203 A * | 5/1965 | Steen | ..................... | A47G 7/047 248/318 |
| 3,193,234 A * | 7/1965 | Thurman | .............. | A47G 7/044 248/312.1 |
| 4,084,779 A * | 4/1978 | Moineau | ............... | A47G 7/047 211/119 |
| 4,440,371 A * | 4/1984 | Wijsman | .............. | A47G 7/047 248/316.7 |

(Continued)

FOREIGN PATENT DOCUMENTS

CA 2972786 A1 * 1/2018 ............... F16B 2/22

*Primary Examiner* — Ebony E Evans
(74) *Attorney, Agent, or Firm* — Tutunjian & Bitetto, P.C.

(57) ABSTRACT

A planter includes a wall and a rim formed at an open end portion of the wall. A set of holes is formed through the wall and is disposed on a surface beneath the rim. The surface beneath the rim includes a shape to obscure a view of the hole below the rim.

12 Claims, 4 Drawing Sheets

(56) References Cited

U.S. PATENT DOCUMENTS

| | | | | |
|---|---|---|---|---|
| 4,631,861 A | * | 12/1986 | Wuthrich | A01G 9/12 |
| | | | | 47/70 |
| 4,744,171 A | * | 5/1988 | Hilliard | A47G 7/047 |
| | | | | 47/67 |
| 4,841,671 A | * | 6/1989 | Reed | A47G 7/044 |
| | | | | 248/312.1 |
| 5,303,506 A | * | 4/1994 | Weder | A47G 7/085 |
| | | | | 47/67 |
| 5,329,728 A | * | 7/1994 | Ray | A47G 7/047 |
| | | | | 24/555 |
| 5,779,210 A | * | 7/1998 | Canson | A47G 7/047 |
| | | | | 248/318 |
| D405,386 S | * | 2/1999 | Ross | D11/152 |
| 6,298,600 B1 | * | 10/2001 | Feldman | A47G 7/047 |
| | | | | 47/67 |
| 7,610,717 B2 | * | 11/2009 | Luken | A01G 9/021 |
| | | | | 24/457 |
| 2005/0097817 A1 | * | 5/2005 | Telles | A47G 7/047 |
| | | | | 47/67 |
| 2005/0189458 A1 | * | 9/2005 | Avinger | A01G 5/04 |
| | | | | 248/301 |
| 2009/0078842 A1 | * | 3/2009 | Chen | A47G 7/047 |
| | | | | 248/318 |
| 2013/0133254 A1 | * | 5/2013 | O'Brien | A47G 7/047 |
| | | | | 47/65.7 |

* cited by examiner

HANGING PLANTER WITH OBSCURED ATTACHMENT POINT

BACKGROUND

Technical Field

The present invention relates to planters, and more particularly to hanging planters having a hanger connect to the planter with a hidden connection point.

Description of the Related Art

Planters provide a decorative element in outside or inside environments. Hanging planters often interface with hangers using a hanger clip that clips on an edge of the planter. This clip design often creeps or loosens over time making the planter susceptible to being released from the hanger during windy or stressed conditions.

SUMMARY

A planter includes a wall and a rim formed at an open end portion of the wall. A set of holes is formed through the wall and is disposed on a surface beneath the rim. The surface beneath the rim includes a shape to obscure a view of the hole below the rim.

Another planter includes a wall and a rim formed at an open end portion of the wall. A set of holes is formed through the wall. The holes are configured to receive an attachment feature of a hanger for suspending the planter. The holes are formed in a recess of the rim to obscure the attachment feature of the hanger with a flush or nearly flush mounting.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
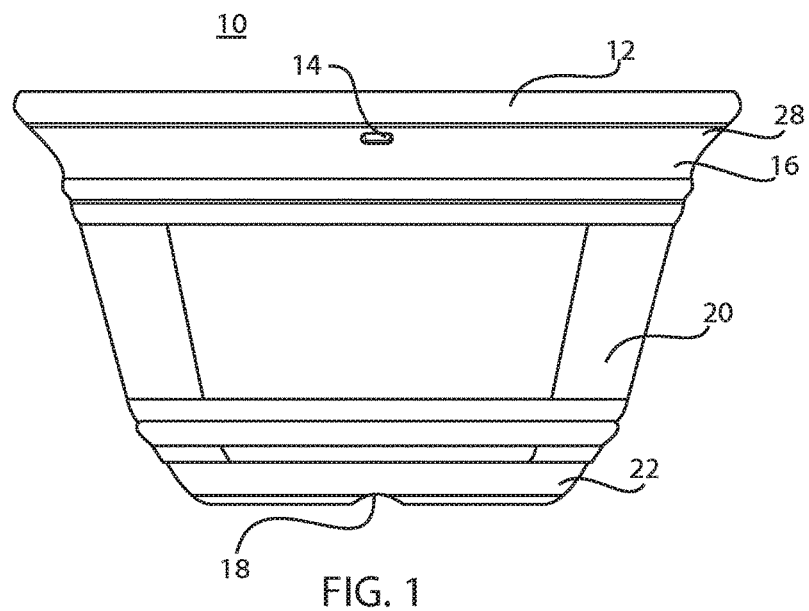
FIG. 1 is a side view of a planter having obscured support holes for use as a hanging or non-hanging planter arrangement in accordance with one embodiment.

In accordance with the present principles, planters are provided that have a hidden attachment point on the planter. The attachment point may be obscured on the planter itself or the attachment point may be obscured by a hanger which secures the hanging planter. In one embodiment, a planter includes a hole or slot along an obscured surface. The obscured surface may include a horizontal surface or an internal surface of the planter. The obscure surface or surfaces may include a hole or slot for receiving a portion of the hanger. The hanger includes three or more (e.g., four) cables terminating in an attachment feature. The attachment feature includes two opposing arms that connect to opposite sides of the walls of the planter. One of the arms is configured to be received within the hole or slot. The two arms each follow the contour of the planter on opposing sides of the planter wall to provide a stable gripping configuration.

In another embodiment, a hole accommodates an attachment feature with a nail head protrusion. The hole is formed through a rim of the planter and receives the nail head protrusion which slides up to lock the nail head protrusion to the planter. The hole may be formed on a recessed surface so that the attachment feature is recessed or nests within or into the planter to provide a low profile attachment connection.

The planters in accordance with the present principles may be fabricated by molding processes using plastics; however, other materials are contemplated as well. For example, the planters may include metal construction, concrete, wood, etc. In one embodiment, the planters are a monolithic construction (e.g., one piece).

It is to be understood that the present invention will be described in terms of a given illustrative architectures; however, other architectures, structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Figure 3:
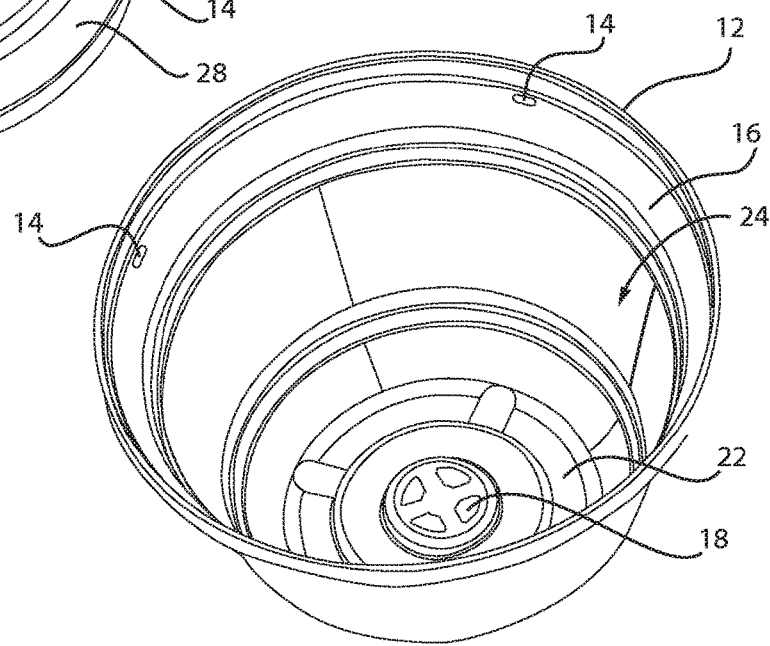
FIG. 3 is a top perspective view of the planter of FIGS. 1 and 2 showing weep holes and internal features along with the obscured support holes for use as the hanging or non-hanging planter arrangement in accordance with the embodiment.

Referring now to the drawings in which like numerals represent the same or similar elements and initially to FIG. 1, a side view a planter 10 is shown in accordance with the present principles. The planter 10 may include a flower pot or other ornamental container. The planter 10 is illustratively shown having a particular shape; however, it should be understood that the planter 10 may include any shape and may be scaled to any size. The planter 10 includes an external wall 20 that defines an interior space 24 (FIG. 3). An upper rim portion or rim 12 includes an outside diameter that is larger than a section 16 below the rim 12. Below the rim 12, a region 28 may include a radius, corner, cusp or other geometric feature that obscures a hole or slot 14. The hole or slot 14 is difficult to see by looking directly at a side of the planter 10.

The planter 10 may include a plurality of holes 14 on opposing sides of the planter 10. The holes 14 form a hidden attachment point for a hanger to suspend the planter 10. However, the attachment points are obscured on the planter 10 itself in the event the user desires to employ the planter as a non-hanging planter. The obscured surface 28 may include a horizontal surface or near horizontal surface of the planter 10. The obscure surface or surfaces 28 may include the hole or slot 14 therethrough for receiving at least a portion of the hanger (not shown).

The planter 10 may include features common for hanging pots as well as non-hanging pots to provide dual usage. The planter 10 includes bottom portion 22 that may include an open bottom (holes 18) or include a pan or reservoir to hold water.

Figure 2:
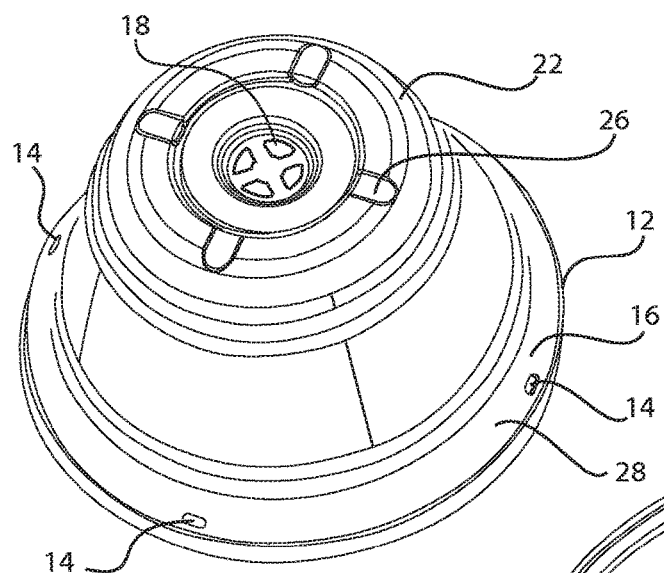
FIG. 2 is a bottom perspective view of the planter of FIG. 1 showing weep holes and bottom features along with the obscured support holes for use as the hanging or non-hanging planter arrangement in accordance with the embodiment.

Referring to FIG. 2, a bottom perspective view shows an illustrative planter 10 with an open bottom portion 22 having holes 18 and other features, such as recesses 26, etc. These features, e.g., holes 18, recesses 26, etc. may be integrally formed with the other portions of the planter 10. The planter 10 may include formed metal, molded plastic, wood or combinations of these and other materials.

Referring to FIG. 3 with continued reference to FIGS. 1 and 2, an interior portion 24 of the planter 10 is illustratively shown. The shape of walls 20 of the planter 10 may be straight, curved or have any other shape. The walls 20 form the interior space 24 along with the bottom portion 22. The planter 10 is configured to receive soil or other media to fill the planter 10, which can be configured to receive a plant or plants.

Figure 4:
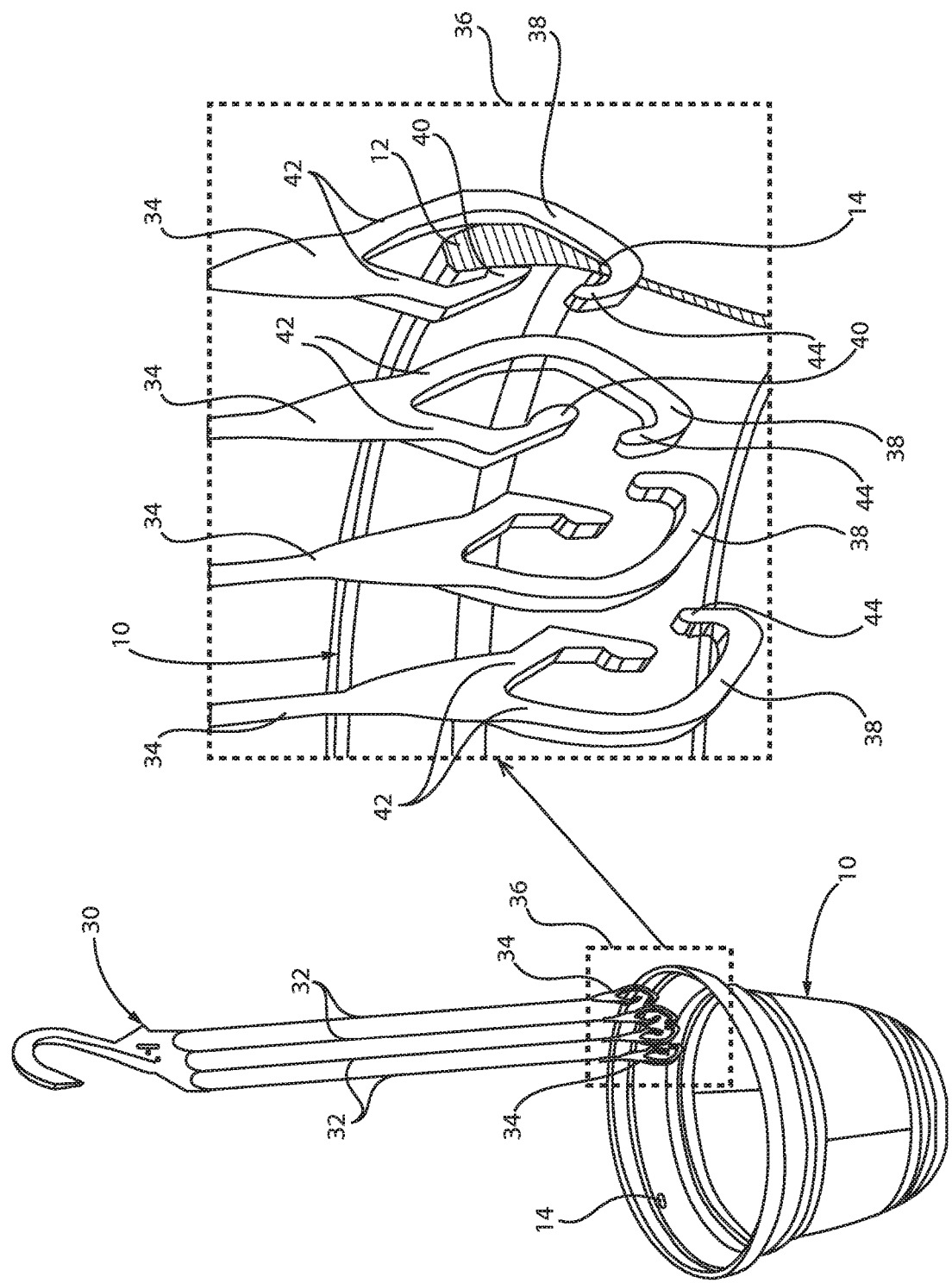
FIG. 4 is a perspective view of the planter of FIG. 1 having a hanger attached to one of the obscured support holes and showing a magnified inset view to show attachment of an attachment feature of the hanger in greater detail in accordance with the present principles.

Referring to FIG. 4, a perspective view shows a hanger 30 having one attachment feature 34 or four attachment features 34 coupled to the planter 10 through a hole 14. In accordance with the present principles, the hanger 30 may include three or more (e.g., four) cables 32, each terminating in an attachment feature 34. The number of cables 32 and attachment features 34 may be greater than three to provide a stable hanging arrangement when assembled. The attachment feature 34 grasping the planter 10 is shown in greater detail in a magnified inset 36.

The attachment feature 34 includes two opposing arms 42. Each arm 42 includes an end portion. The end portions include an internal end portion 40 and an external end portion 38. The internal end portion 40 engages an interior surface of the rim 12. The arm 42 and the internal end portion 40 may engage the rim 12 at one or more locations. The external end portion 38 engages an exterior surface of the rim 12 and includes a tab 44 that can be inserted within the hole or slot 14 at or below the rim 12. The external end portion 38 may engage the rim 12 at one or more locations. The arms 42 connect to opposite sides of the rim 12 of the planter 10 to create a stable fastening mechanism. In one embodiment, the two arms 42 each follow the contour of the planter 10 on opposing sides of the planter wall or rim 12 to provide a stable gripping configuration. In one embodiment, the internal end portion 40 engages the interior of the planter at a different height than the tab 44 of the opposing arm 42. The tab 44 is configured to be received within the hole or slot 14.

While the feature 34 locks the planter 10 in, the feature 34 can be manipulated by hand to release the planter 10 from the feature 34. The motion needed to release the feature 34 is not easily reproducible by windy conditions or other natural conditions that a hanging planter would experience.

In useful embodiments, the planter 10 has a set of holes 14 that are configured to receive the tab 44 of the hanger assembly 30 to secure the planter in a hanging arrangement. The hanger assembly 30 includes attachment features 34 that each have two arms 42 that stabilize the planter from opposite sides of the wall 20. The two arms 42 that stabilize the planter from opposite sides of the wall include a first arm configured to engage an inner surface of the planter at a first height and a second arm that includes a tab at its distal end portion that fits within a hole of the set of holes. The second arm engages an external surface of the planter at a second height different from the first height. The second arm (42) includes an internal facing hook that hooks under the external surface through the hole 14 of the planter 10. The rim 12 can include a smooth contour or surface 28 such that the set of holes 14 provide the only attachment points for a hanger assembly (30, FIG. 5) to secure the planter 10. The surface 28 can be made unsuitable for connection of a hanger assembly (e.g., no ridges or sharp cusps for the hanger assembly to grip). In this way, fanciful contours of the planter 10 are enabled by the hanger arrangement.

Figure 5:
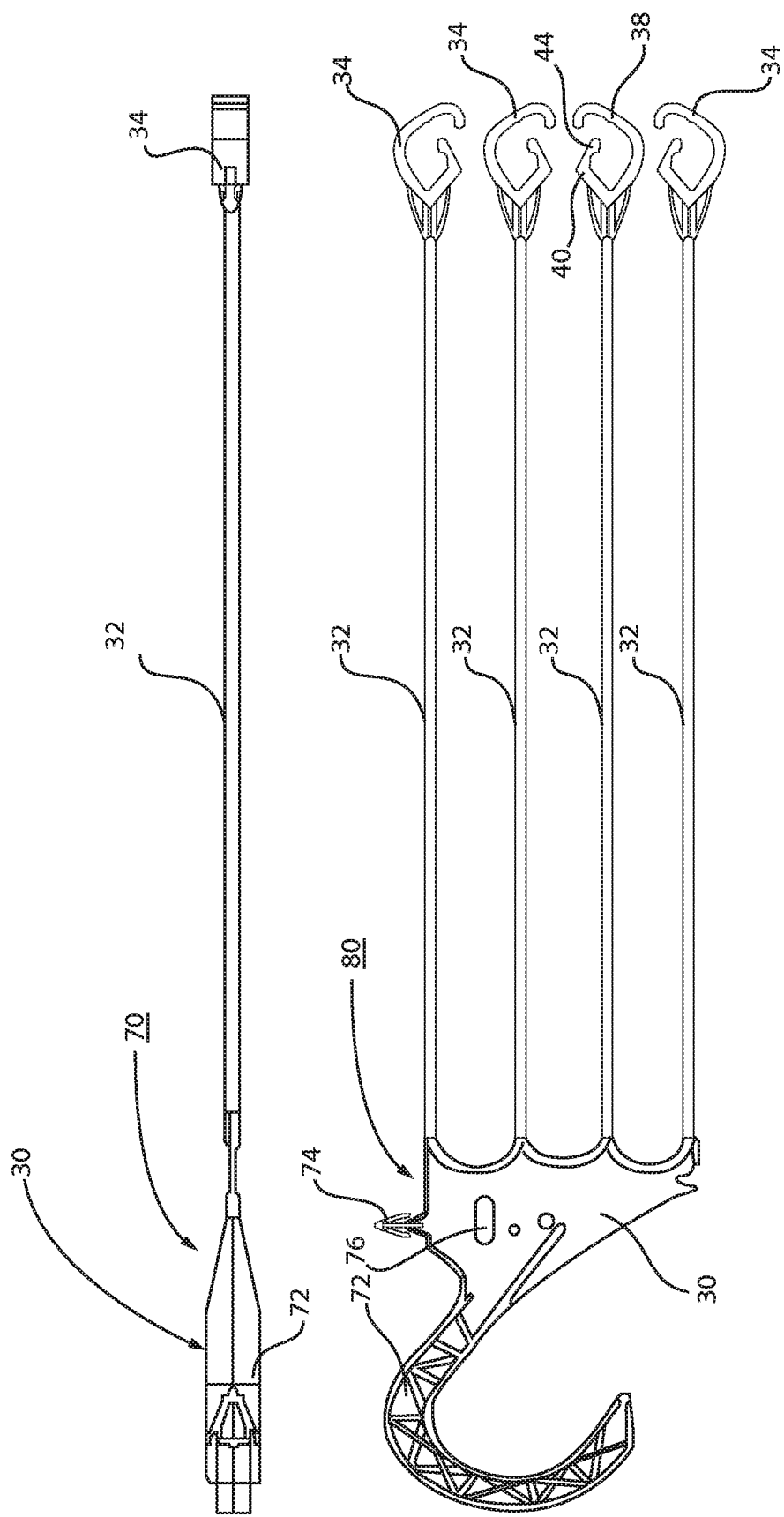
FIG. 5 shows a side view and a front view of a hanger for attaching to the obscured support holes in accordance with the present principles.

Referring to FIG. 5, a side view 70 and a front view 80 are illustratively shown for a hanger 30. The hanger 30 includes a head 72 that is configured to attach to a peg, line, wire, etc. for hanging the planter (10). The head 72 may include attachment features 74 that enable packaging of the hanger 30 with the planter 10 or with other parts. Holes 76 or other features may be employed for displaying the hanger 30 or an assembly including the hanger 30 in a retail or other environment. In one embodiment, the hanger 30 includes a unitary plastic piece including cables 32 and attachment features 34. In other embodiments, the hanger 30 may be formed from one or more materials and include multiple pieces.

The hanger 30 is depicted as having a particular shape; however, any suitable shape may be employed, e.g., round, square, rectangle, triangle, hexagon, etc. In addition, the planter 10 is also depicted as a circular shape; however any suitable shape may also be employed, e.g., square, rectangle, triangle, hexagon, etc.

Figure 6:
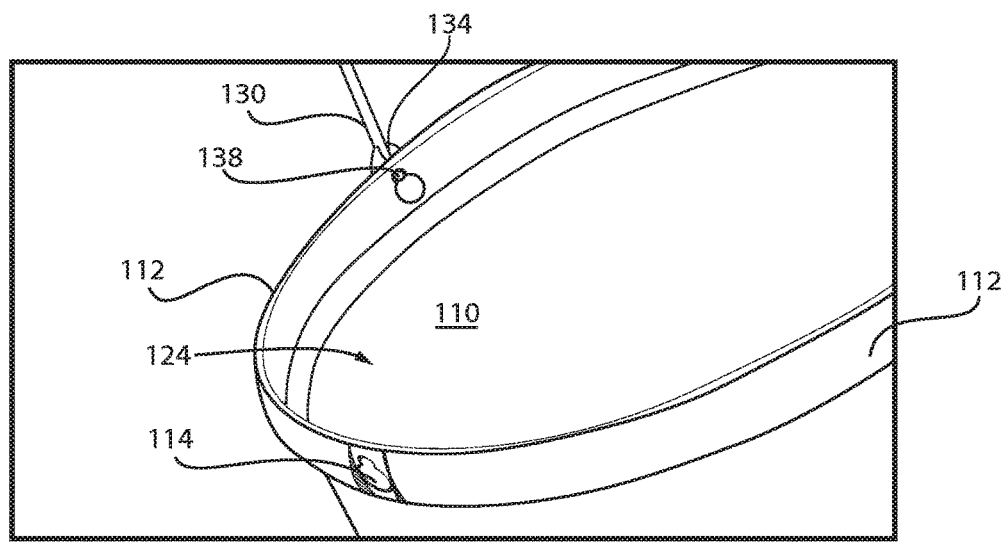
FIG. 6 is a perspective view of a planter showing an interior view of a nail head attachment feature/protrusion installed to secure the planter in a hanging arrangement in accordance with another embodiment.
Figure 7:
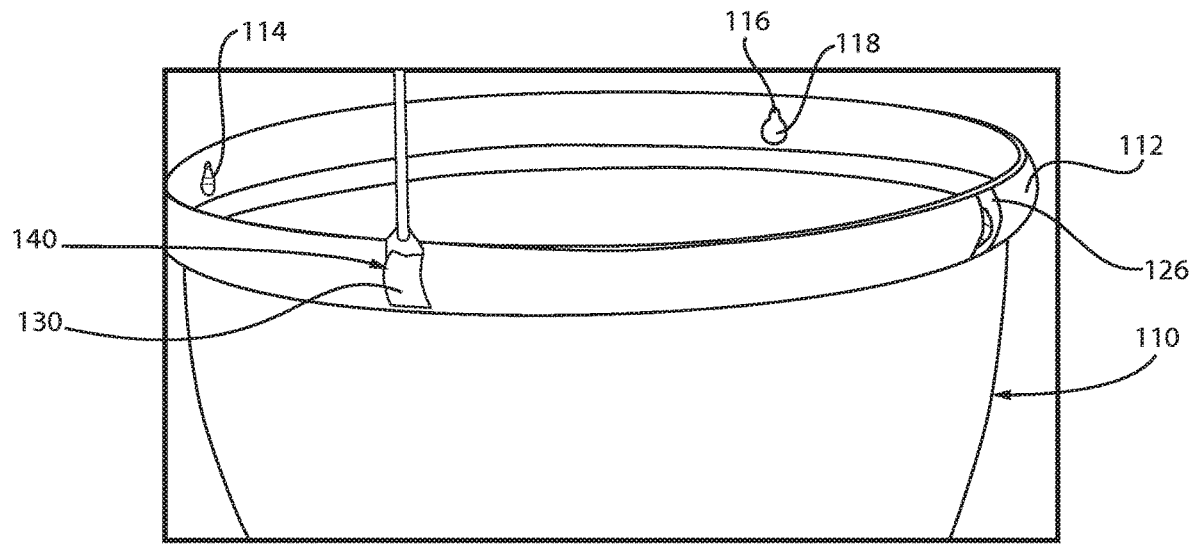
FIG. 7 is a side perspective view of the planter of FIG. 6 showing an exterior view of the nail head attachment feature/protrusion installed to secure the planter in a hanging arrangement where the attachment feature is flush or near flush to obscure the connection in accordance with the present principles.

Referring to FIGS. 6 and 7, a planter 110 is depicted at different perspectives. In FIG. 6, a perspective view of the planter 110 is shown having one hanger 130 attached in a hole 114 formed through a rim 112. The hanger 130 is shown from an interior 124 of the planter 110. In FIG. 7 is a side perspective view of the planter 110 is shown having one hanger 130 attached in a hole 114 formed through the rim 112. The hanger 130 is shown from an exterior of the planter 110.

In FIGS. 6 and 7, the hanger 130 is attached to the planter 110 using a nail head 138 protruding from an attachment feature 134 at the end of the hanger 130. The nail head 138 fits within a diameter 118 of a larger portion of hole 114. The nail head feature 138 is then slid upward and a shaft of the nail head feature 138 engages the rim 112 in hole portion 116. The rim 112 include a recess 126 on an exterior of the rim 112 that permits the attachment feature 134 to slide into place. The recess 126 includes a rectangular shape that matches the attachment feature 134 in size and depth. In this way, when the attachment feature 134 is engaged in the hole 114 and recess 126, an exterior portion 140 of the attachment feature 134 is flush or nearly flush with an exterior portion of the rim 112. This mounting reduces the visual impact of the attachment feature 134 to the planter 110 and provides an aesthetically pleasing effect. In addition, the flush or near flush mounting prevents snags by clothing, etc. or passing foot traffic. The hole 114 is obscured by the attachment feature 134, and the attachment feature 134 is obscured by the flush or nearly flush mounting.

The planter 110 includes four equally spaced holes 114, although three or more holes and corresponding attachment features 134 may be employed. The hole 114 accommodates the attachment feature 134 with the nail head protrusion 138. The hole 114 is formed through the rim 112 of the planter 110 and receives the nail head protrusion 138, which slides up to lock the nail head protrusion 138 to the planter 110. The hole 114 may be formed on a recessed surface so that the attachment feature 134 is recessed or nests within or into the planter 110 to provide a low profile attachment connection. Employing this scheme, the weight of the planter 110 and its contents are employed to lock the attachment features 134 within the hole 114 and therefore to the rim 112.

Figure 8:
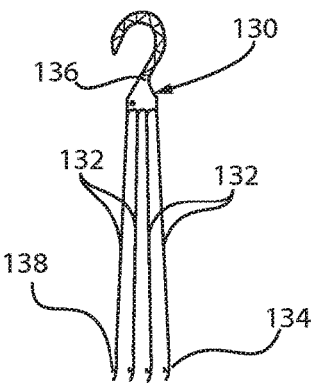
FIG. 8 is a side view of a hanger arrangement having a nail head attachment feature/protrusion in accordance with an illustrative embodiment.

Referring to FIG. 8, a side view 170 is illustratively shown for a hanger 130. The hanger 130 includes a head 136 that is configured to attach to a peg, line, wire, etc. for hanging the planter (110). The head 136 may include attachment features that enable packaging of the hanger 130 with the planter 110 or with other parts. Holes or other features may be formed in the hanger 130 and employed for displaying the hanger 130 or an assembly including the hanger 130 in a retail or other environment. In one embodiment, the hanger 130 includes a unitary plastic piece including cables 132 and attachment features 134. In other embodiments, the hanger 130 may be formed from one or more materials and include multiple pieces.

The hanger 130 is depicted as having a particular shape; however, any suitable shape may be employed, e.g., round, square, rectangle, triangle, hexagon, etc. In addition, the planter 110 is also depicted as a circular shape; however any suitable shape may also be employed, e.g., square, rectangle, triangle, hexagon, etc. Further, the planter 110 may include any suitable materials.

The planter 110 includes the set of holes 114 that are configured to receive a nail head of a hanger assembly 130 to secure the planter in a hanging arrangement. The hanger assembly 130 can include a contoured portion (134) from which the nail head 138 protrudes. In useful embodiments, the contoured portion (134) includes a contour that matches a contour of the rim 112. In this way, the attachment point of the hanger assembly 130 is obscured when assembled to the rim 112.

In one embodiment, the nail head 138 protrudes internally from an exterior of the rim 112. The set of holes 114 includes a set of vertical slots with two opening sizes, a first size 118 to receive the nail head and a second size 116 to engage a shaft supporting the nail head. The rim 112 includes a smooth contour such that the set of holes 114 provides the only attachment points for the hanger assembly 130 to secure the planter 110.

Having described preferred embodiments for hanging planter with obscured attachment point (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is desired to be protected by Letters Patent is set forth.

What is claimed is:

1. A planter, comprising:
   a wall that includes a set of holes through a surface of a top portion of the wall;
   a rim formed at an open end portion of the wall, above the set of holes; and
   a hanger assembly including a set of attachment features, each attachment feature including two arms that branch from a common point at the attachment feature, wherein the two arms include a first arm that is configured to engage an inner surface of the planter at a first height and a second arm that extends around the rim and includes an internally facing hook, at a distal end portion, that hooks under the rim and passes through a respective hole in the set of holes and bends toward the rim to secure the planter in a hanging arrangement, and wherein each first arm includes a first length, that extends inwardly into the planter, and a second length, that extends from a distal end of the first length and makes contact with the inner surface, the second length having an enlarged section at its distal end.

2. The planter as recited in claim 1, wherein the second arm engages an external surface of the planter at a second height different from the first height.

3. The planter as recited in claim 1, wherein the hanger assembly includes a one piece monolithic construction.

4. The planter as recited in claim 1, wherein the rim includes a smooth contour such that the set of holes provide the only attachment points for the hanger assembly to secure the planter.

5. The planter of claim 1, wherein each second arm includes a curved length that extends from the common point to a respective hole from the set of holes and the internally facing hook at a distal end of the curved length.

6. A planter, comprising:
   a wall that includes a set of holes through a surface of a top portion of the wall;
   a rim formed at an open end portion of the wall, above the set of holes; and
   a hanger assembly including:
      a hook;
      a set of cables attached to the hook; and
      a set of respective attachment features connected at ends of respective cables, each attachment feature including two arms that branch from a common point at the respective cable, wherein the two arms include a first arm that is configured to engage an inner surface of the planter at a first height and a second arm that extends around the rim and includes an internally facing hook, at a distal end portion, that hooks under the rim and passes through a respective hole in the set of holes and bends toward the rim to engage the inner surface of the planter at a second height and to secure the planter in a hanging arrangement, wherein each first arm includes a first length that extends inwardly from the respective cable into the planter and a second length that extends from a distal end of the first length and makes contact with the inner surface, the second length having an enlarged section at its distal end, and wherein each second arm includes a curved length that extends from the respective cable to a respective hole from the set of holes and the internally facing hook a distal end of the curved length.

7. The planter as recited in claim 6, wherein the second height is different from the first height.

8. The planter as recited in claim 6, wherein the hanger assembly includes a one-piece monolithic construction.

9. The planter as recited in claim 6, wherein the rim includes a smooth contour such that the set of holes provide the only attachment points for the hanger assembly to secure the planter.

10. The planter as recited in claim 6, wherein the set of cables includes four cables.

11. The planter as recited in claim 6, wherein the set of cables is attached to the hook in a linear arrangement.

12. The planter as recited in claim 6, wherein the hanger assembly further includes an attachment feature on a body of the hook.

* * * * *